2,995,852
FISH HOOKING DEVICE
Kalman Szillage, Gary, Ind.
(6706 Monroe Court, Merrillville, Ind.)
Filed Mar. 31, 1958, Ser. No. 725,009
4 Claims. (Cl. 43—15)

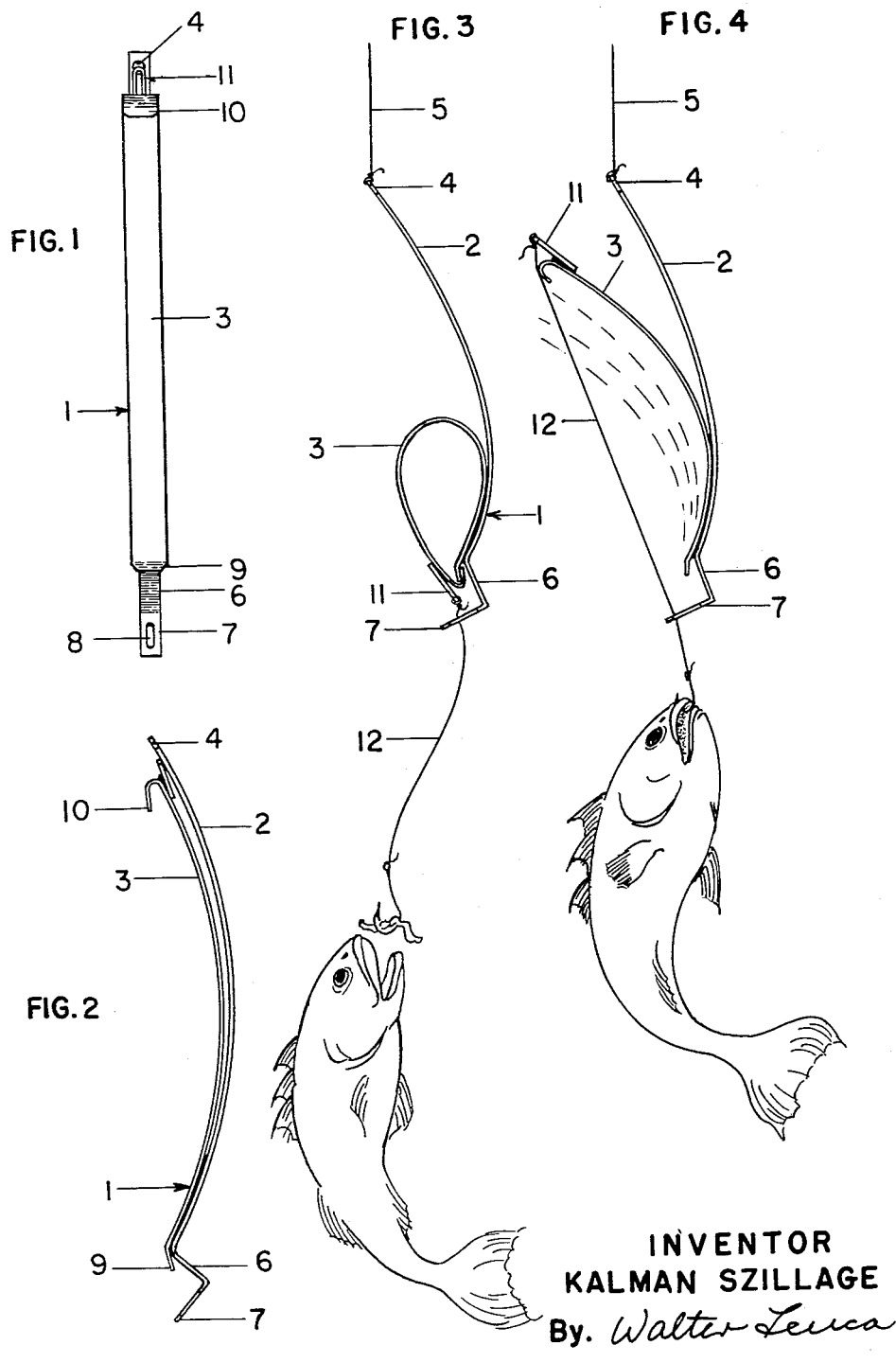

This invention relates to a hooking device and has particular reference to a fish hooking device interposed in the fishing line.

Ordinarily a fishing line is provided with a float which serves to keep the baited hook at a predetermined level below the water line and to indicate when the fish has seized the baited hook. When this occurs, the float will move with a bob on the surface of the water thereby indicating to the fisherman to pull in the line to impale the hook into the mouth of the fish. Since the bobbing motion of the float is ordinarily the only indication that a fish has struck at the hook, an error in timing the pull will result in either a premature pull of the line which will pull the hook away from the fish before the fish has securely seized the hook or a delayed pull of the line which will often allow the fish to take the bait or a part thereof without being impaled by the hook. This problem of timing the pull on the fish line in order to impale the hook in the mouth of the fish is aggravated when the float cannot be easily observed as when fishing at night or when fishing through ice at which time weather conditions are usually not conducive to patient judgment.

I have invented a novel fish hooking device which is interposed in the fishing line and when triggered by a fish, will cause the hook to be impaled in its mouth by a rapid and forceful movement thereof.

Another object of this invention is to provide a fish hooking device which is simple to operate, dependable and economical to manufacture.

A complete understanding of this invention may be obtained from the following detailed description and explanation which refer to the accompanying drawings illustrating the present preferred embodiment. In the drawings, FIGURE 1 is a front elevation of this invention, FIGURE 2 is a side elevation thereof, FIGURE 3 is a side elevation of this device shown interposed in a fishing line and shown cocked, ready to hook, and FIGURE 4 is a view similar to FIGURE 3 but showing the device in hooking operation.

Referring now to the drawings, numeral 1 designates the fish hooking device generally. It comprises a line connecting bar member 2 and a leader connecting spring member 3. The top end of bar member 2 is provided with connecting means such as hole 4 through which line 5 is inserted and secured thereto. The other end of bar member 2 is angulated outwardly as at 6 and then inwardly as at 7 and at the end thereof is provided preferably with an elongated opening 8. Spring member 3 is secured to bar member 2 at the lower end thereof in any convenient manner such as riveting or soldering. Said spring member 3 is positioned on connecting bar 2 so that is lower end overhangs the angled end 6 of the connecting bar and is bent downwardly to form a lip 9. The upper end of said spring member 3 is also bent downwardly to form a catch 10 which engages lip 9 when the spring leaf 3 is looped end to end. The upper end of said spring member 3 is provided with an eyelet member 11 extending above the catch 10 which serves as a connecting means to which the leader 12 of the line is secured.

I prefer to form the connecting bar 2 with a bow so that the upper or free end of the spring member 3 follows an approximate hypocycloid path when said spring member is released from its cocked position. The bow in connecting bar 2 also allows the free end of spring member 3 to move away from end 7 in such direction that the leader 12 is guided through opening 8 therein with minimum of friction force against the edges of opening 8. This feature also prevents seaweed and other foreign material in the water from lodging between the bar member and spring member when the device is pulled through the water. This invention is interposed in the fishing line by connecting the fishline 5 to the top end of bar member 2 and the leader 12 to the eyelet member 11 on spring leaf 3 and passing the leader 12 through opening 8. To cock this device, spring member 3 is bent downwardly so that catch 10 engages the lip 9. This may be done by manipulating the leader 12 through elongated opening 8.

When the fish bites at the bait and pulls the hook, the catch 10 disengages from lip 9 and the free end of spring member 3 springs upwardly to its normal position. In so doing, the hook is jerked upwardly and is impaled into the mouth of the fish.

It will be apparent from the foregoing that my improved fish hooking device will automatically impale the hook in the mouth of the fish after the fish has seized the baited hook, it being no longer required for the fisherman to judge when to pull the line to impale the fish by observing the action of the float.

Although I have disclosed herein the preferred embodiment of my invention, I intend to cover as well any change or modification therein which may be made without departing from the spirit and scope of the invention.

I claim:

1. A fish hooking device for connection to a fishing line comprising a pair of blade members, one of said blade members adapted to be vertically suspended from said fishing line at one end, the other end of said blade member being angulated and having an aperture therein, the other blade member being resilient, one end of said other blade member being fixed adjacent the said angulated end of the first named blade member in lapping relation thereto, said fixed end of said other blade member overhanging said angulated end to provide a lip, and the free end of said other blade member having a hook to engage said lip when said other blade member is looped end to end, and means for attaching a leader to the free end of said other blade member, said leader adapted to pass through said aperture.

2. A fish hooking device for connection to a fishing line comprising a stationary member and a spring member, said stationary member having means adapted to be vertically suspended from said fishing line at one end, the other end of said stationary member being angulated and having an aperture therein, one end of said spring member being fixed adjacent said other end of said stationary member in lapping relation thereto, said fixed end of said spring member overhanging said angulated end to provide a lip, the free end of said spring member being hooked to engage said lip when said spring member is looped end to end, said stationary member being bowed to allow the free end of said spring member to follow an approximate hypocycloid path, and means for attaching a leader to the free end of said other blade member, said leader adapted to pass through said aperture.

3. A fish hooking device for connection to a fishing line and a leader line comprising a stationary member and a spring member, said stationary member having means adapted to be vertically suspended from said fishing line at one end, the other end of said stationary member being angulated and having an aperture therein, one end of said spring member being fixed adjacent said angulated end of said stationary member in lapping relation thereto, said fixed end of said spring member overhanging said angulated end to provide a lip, the free end of said spring member being hooked to engage said lip when said spring member is looped end to end, said stationary member being bowed to allow the free end of said spring member to follow an approximate hypocycloid path, and connecting means on said free end of said spring member to which said leader line is secured.

4. In a fishing apparatus wherein a line is suspended from a support and a hook is connected to said line, the combination therewith of a pair of blade members, one of said pair of blade members connected to said line at one end, the other end of said one blade member being angulated and having an aperture therein, the other blade member being resilient, one end of said other blade member being fixed adjacent the said angulated end of the first named blade member in lapping relation thereto, said fixed end of said other blade member overhanging said angulated end to provide a lip, the free end of said other blade member having a hook to engage said lip when said other blade member is looped end to end, and connecting means on said free end of said other blade member to which said hook is connected.

References Cited in the file of this patent

UNITED STATES PATENTS

| | | |
|---|---|---|
| 999,214 | Filipowski | Aug. 1, 1911 |
| 1,805,410 | McCall | May 12, 1931 |
| 2,504,822 | Fritscher | Apr. 18, 1950 |
| 2,526,980 | Turchan | Oct. 24, 1950 |
| 2,615,273 | Meller | Oct. 28, 1952 |